Figure 1:
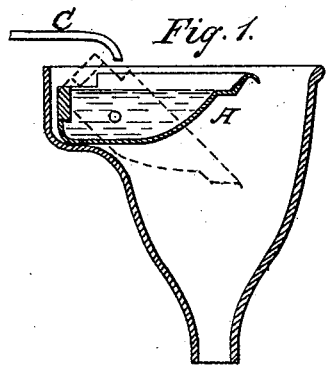

W. G. RHOADS.
Flushing-Box for Water-Closets.

No. 202,586.  Patented April 16, 1878.

WITNESSES:

INVENTOR
William G. Rhoads
By David A. Burr
Attorney

UNITED STATES PATENT OFFICE.

WILLIAM G. RHOADS, OF PHILADELPHIA, PENNSYLVANIA.

IMPROVEMENT IN FLUSHING-BOXES FOR WATER-CLOSETS.

Specification forming part of Letters Patent No. 202,586, dated April 16, 1878; application filed March 18, 1878.

*To all whom it may concern:*

Be it known that I, WILLIAM G. RHOADS, of the city and county of Philadelphia, and State of Pennsylvania, have invented new and useful Improvements in Flushing-Boxes for Water-Closets, of which the following is a specification:

The invention relates to apparatus for producing at regular intervals the discharge of a measured volume of water obtained and accumulated from a comparatively constant stream for the purpose of flushing water-closets, urinals, sewers, &c., and of supplying an intermittent flow of water for all desired purposes.

It consists in the combination of a siphon with a pivoted or tilting tank in such manner as that the tipping of the tank, when full, shall operate to charge the siphon, and thus bring it into action.

It consists, also, in the combination of inwardly or outwardly projecting offsets with the upper part of a tilting tank, so that its center of gravity shall be suddenly shifted from one side of its axis to the other by a reduction of the water area at the supported end, or its enlargement at the opposite end of the tank, for the purpose of producing promptly and suddenly, instead of gradually, an automatic tipping of the tank when the water has reached a given level therein. This combination of one or two offsets, as described, with the top of the tank serves to produce a quick, sharp, and certain movement of the tank when the water-level has reached the desired height.

The siphon and tilting tank are effectively combined, either by the intervention of a stationary service-box or cistern connected with the siphon, and arranged to be filled by a water-supply delivered through a tilting tank of such capacity as that its discharge, when full, shall deliver a sufficient quantity of water to fill and start the siphon whenever the water-level in the cistern has reached the bend of the siphon, or by limiting the movement of the tilting tank, and so connecting the siphon directly therewith as that a comparatively slight tipping of the tank, when full, shall operate to submerge the bend of the siphon, and thus fill it and bring it into action.

The siphon, when started, will operate to deliver very quietly and very rapidly, in a large solid stream, unbroken by any admixture of air, the water contained in the siphon cistern or tank. The volume of water thus intermittently delivered by the combined action of a self-tipping tank and siphon is determined by the size of the siphon and delivery-pipe, its quantity by the capacity of the tank with which the siphon is connected, and the frequency of its delivery by the size of the supply-stream, the latter being determined and varied, at pleasure, by means of a cock in the supply-pipe.

Figure 2:
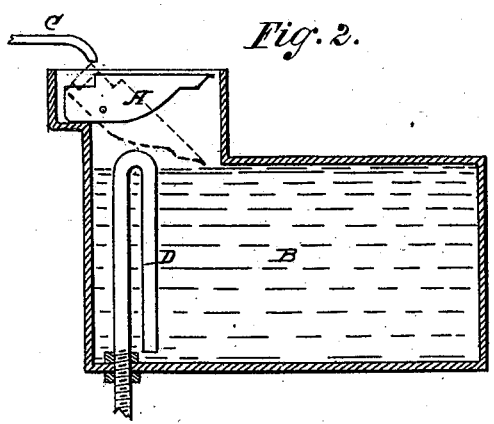
Figure 3:
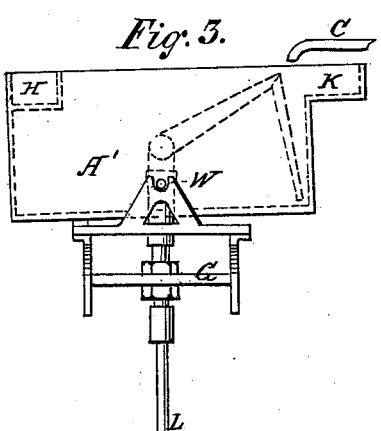

In the accompanying drawings, Figure 1 is a sectional view, illustrating an improvement in the common form of an automatic tilting flushing-tank; Fig. 2, a similar view, illustrating the combination of an automatic tilting box with a stationary tank or cistern, and with a discharging-siphon for producing an intermittent action of the siphon and discharge of the tank. Fig. 3 is a front view, Fig. 4 a rear view, partly in section, and Fig. 5 a top view, of an improved siphoned tipping tank.

Figure 4:
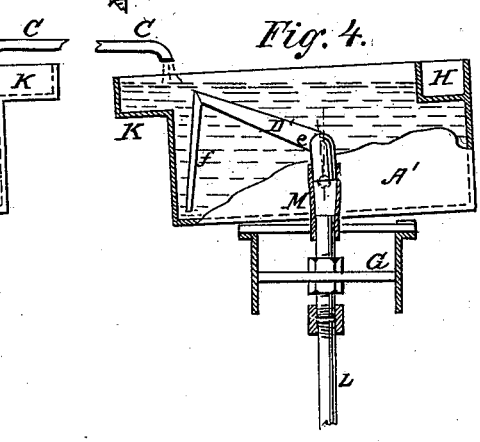

A, Figs. 1 and 2, and A', Figs. 3 and 4, are tilting tanks or pivoted flushing-boxes of modified forms. Each tank is so pivoted upon lateral trunnions W, and so counterbalanced, as that it will maintain its equilibrium and remain in its normal position to receive and hold a supply of water until nearly full, but will then tip over. (See dotted lines, Figs. 1 and 2.)

H is an inward offset, made to project abruptly within the tank A or A' from its supported end, near the upper edge thereof, so as to diminish the superficial area of the tank at that level on that side of its axis. K is an outwardly-projecting offset, the converse of H, so formed near the top of the unsupported end of the tank as to increase suddenly its superficial area at that point or level.

The effect of either of the offsets H or K, or of the two combined, is to produce automatically, at any desired level, a sudden change in the relative position of the center of gravity in the tank as it fills up, for so soon as the water-level has risen above the lower edge of the offset the displacement of the water from the one side or the extension of its surface on the other will at once shift the center of gravity from the one side of the pivotal axis to the other, and the preponderant weight of water at the unsupported end will cause the tank to tip over.

The moment at which the tank shall tip in filling is determined by the dimensions of the offsets and the height at which they are placed above the axis of the tank.

B, Fig. 2, is a stationary tank or cistern, fitted with a siphon, D, arranged to discharge it when in action, the longer leg of the siphon being made to pass with a water-tight joint through the bottom of the tank.

The tank is covered over, excepting only a small space over the top of the siphon, which is built up to form a funnel or hopper, within which a small automatic tilting tank, A, fed by a supply-pipe, C, is duly pivoted.

The bend of the siphon D is made to project up into the hopper, and the capacity of the tipping tank A is so proportioned relatively to the size of the siphon and the area of the tank or hopper around its bend as that when the water-level has reached the bend a single additional discharge of the tipping tank, when full, will suffice to submerge it and start the siphon.

In operation, the tilting tank A, receiving a continual supply from the pipe C, will automatically tip over and discharge its contents (see dotted lines, Fig. 2) so soon as the water-level therein rises above the level of the bottom of the offsets near the top. When emptied, the tank will automatically right itself because of the preponderant weight of its rear end when not counterbalanced by a column of water. The intermittent discharge of the tipping tank into the cistern B will gradually fill it, until, when the water-level therein has reached the contracted space into which the top or bend of the siphon projects, a single additional discharge of the tilting tank will suddenly raise the water-level above the bend, and thus bring the siphon into action to discharge the entire contents of the cistern.

Figure 5:
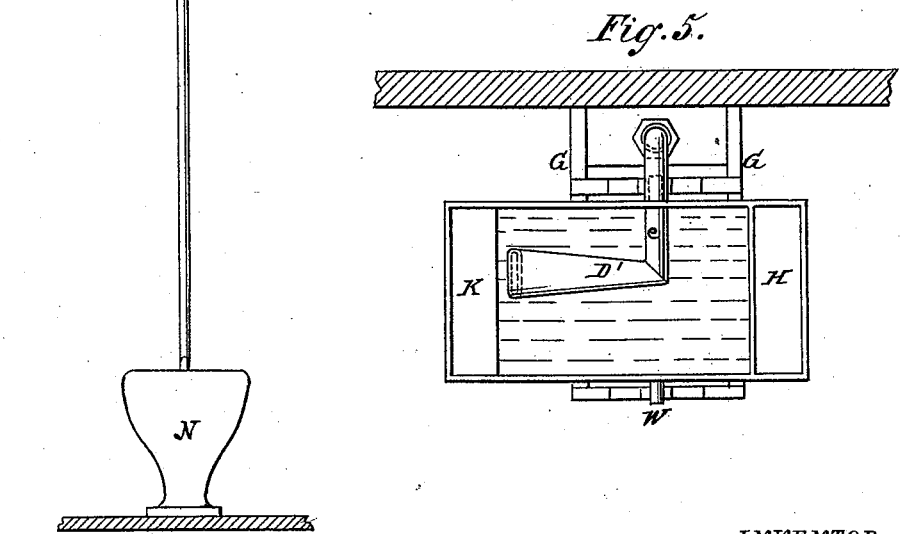

A′, Figs. 3, 4, and 5, is a rectangular tank, pivoted upon trunnions or pivots $w\,w$, projecting laterally below the center of the box, about midway between its ends, and which rest in simple bearings supported by a bracket, G. The tipping movement of the tank is restricted by the bracket, so that its play is comparatively slight. Its upper end is fitted with either an outwardly or an inwardly projecting offset, K or H, or with both, as shown in the drawings, to produce an automatic movement of the tank, as hereinbefore described.

A siphon, D′, which is flattened or extended in narrow form at its bend, (see Fig. 5,) is fitted within the tank, so that its shorter leg $f$, Fig. 4, shall extend from the bottom nearly to the top of the tank, at that end thereof which is made to tip down when the tank is full. The longer leg $e$ of the siphon, gradually changing from a flat to a cylindrical form, (see Fig. 5,) extends from the bend to a central point over the axis, where it is continued through the rear side of the tank, and bent downward over the journal on that side to connect, by means of a flexible joint, with a fixed discharge-pipe, L, supported by the bracket G, or with a suitable nipple secured upon the bracket, to which the siphon and discharge-pipe may each be readily connected, as shown in Fig. 4.

The flexible joint is readily and simply made by means of a rubber sleeve, M, Fig. 4, fitting over and properly secured to the end of the siphon and of the discharge-pipe or nipple.

In operation, the siphoned tipping tank A′ is supplied with water delivered in a small constantly-flowing stream from a service-pipe, C. When empty the tank is so balanced upon its pivots as to assume automatically and maintain a right position, either horizontally or a little inclined, so as to elevate slightly the siphon end, as shown in Fig. 3. So soon, however, as, in filling, the water-level reaches the offsets H K, and begins to rise above the bottom thereof, the weight of the additional body of water, partly cut off from the end H and carried outward at the end K, quickly operates to tip the tank toward the siphon end K, which is allowed to drop far enough to produce thereby a submersion of the bend of the siphon.

The arrangement of the flexible joint M of the siphon over the axis of the tank permits a free movement of the tank with but slight movement in the joint, while the extended flattened form of the bend of the siphon permits its submersion with a movement of the tank so slight as, in fact, to be hardly noticeable.

So soon as the bend of the siphon is submerged it is immediately brought into action, and will deliver noiselessly and rapidly to the water-closet N, through the pipe L, a full, steady, constant stream until the tank is emptied. When the action of the siphon has caused the water-level in the tank to fall below the offsets H K, the tank, relieved of the preponderant weight of water at its siphon end, will right itself without interrupting in the least the action of the siphon. A discharge of the contents of the tank through the siphon will thus be automatically produced as often as the tank becomes full, and the frequency thereof will be determined by the amount of water delivered from the pipe C, by which the tank is fed.

It is evident that the tilting tank A or A′ may be arranged in combination with a siphon, as herein described, so as to be operated at will, instead of automatically at regular intervals, by omitting the offsets H K, controlling the water-supply by means of a float and cock, in the customary manner, to prevent an overflow when the tank is full, and connecting with the tank a suitable cord, or other device for tipping it when desired, and a weight to insure its return after being tipped and emptied.

I claim as my invention—

1. The combination, with a tilting tank, of a siphon arranged to be charged and brought into action by the tipping of the tank when full, substantially as and for the purpose herein set forth.

2. The combination, with the upper portion of a tilting tank, A′, of an offset, H, projecting inwardly at one end thereof, and serving to suddenly reduce the area of the tank upon one side of its axis, substantially as and for the purpose herein set forth.

3. The combination, with the upper portion of a tilting tank, A′, of an offset, K, projecting outwardly at one end thereof, and serving to suddenly enlarge the area of the tank upon one side of its axis, substantially as and for the purpose herein set forth.

W. G. RHOADS.

Witnesses:
JOHN URIAN,
ROBT. G. LOUGHERY.